(12) United States Patent
Adams

(10) Patent No.: US 6,237,470 B1
(45) Date of Patent: May 29, 2001

(54) COOKING APPARATUS HAVING OPENING FOR FOOD MANIPULATION

(76) Inventor: Thomas D. Adams, 7721 Goldcrest Dr., San Diego, CA (US) 92119

( * ) Notice: Subject to any disclaimer, the term of this patent is extended or adjusted under 35 U.S.C. 154(b) by 0 days.

(21) Appl. No.: 09/548,207

(22) Filed: Apr. 13, 2000

(51) Int. Cl.$^7$ .............................. A47J 37/00; A47J 43/00
(52) U.S. Cl. ................... 99/422; 99/348; 99/341; 99/645; 99/646 R; 220/573.1; 220/912; 220/676
(58) Field of Search ................... 99/422, 645, 646 C, 99/646 R, 341, 348; 220/912, 573.1, 731, 676, 661; 126/229 C, 381, 369, 390, 373

(56) References Cited

U.S. PATENT DOCUMENTS 2,559,196 * 7/1951 Medved .................................. 99/422
5,943,947 * 8/1999 Adams .................................. 99/341

* cited by examiner

*Primary Examiner*—Reginald L. Alexander
(74) *Attorney, Agent, or Firm*—Donn K. Harms

(57) ABSTRACT

A cooking pan and lid. The side wall of the pan portion has an elevated portion along its upper periphery. This elevated portion has an opening therethrough for entry of a cooking utensil for the purpose of stirring or otherwise manipulating food cooking in the pan. A plug that is receivable into the opening through the upper periphery of the pan to close the opening while stirring or manipulating of the food in the pan is not required. A vent opening is provide along the periphery of the lid to vent gasses from the food when cooking while the plug is inserted in the opening.

8 Claims, 1 Drawing Sheet

COOKING APPARATUS HAVING OPENING FOR FOOD MANIPULATION

1. FIELD

The following invention disclosure is generally directed to cookware and is specifically directed to cookware having a pan portion and a lid portion wherein the pan portion includes a partial elevated periphery having a food manipulation port or opening therethrough.

2. PRIOR ART

U.S. Pat. No. 5,943,947 issued to Applicant of the present application, Thomas D. Adams, teaches a cooking apparatus that includes a pan or skillet coupled with a lid of the invention which together form a special cooking chamber where a utensil may remain operable while it is in the cooking chamber and while the lid is in place on the skillet. In addition, a special port in the lid permits the adding of spices, cooking oils and other ingredients to the cooking chamber without removing the lid. In this way, the lid of the invention allows one to prepare foods in the cooking chamber without having to remove the lid portion thereof.

U.S. Design Pat. No. Des 381,555 issued to John W. Baker; U.S. Des No. 380,934 issued to David Alarid; U.S. Des Pat. No. 65,213 issued to S. C. Abbey; and U.S. Pat. No. 1,398,655 issued to J. A. Smith all teach non covered frying pans with an extended periphery surface at the end of the pan opposite the handle end.

SUMMARY OF THE INVENTION

The invention is directed to a cooking apparatus that comprises a pan and a lid for covering the pan surface. The pan has a portion of its periphery elevated so as to have a horizontal and/or a vertical opening there through suitable to receive a utensil for turning, stirring or mixing the contents of the pan while cooking is in progress and for adding ingredients as the contents of the pan are being cooked.

The pan elevated portion allows for the lid to be constructed of transparent glass, plastic, PYREX, or any transparent material suitable for the purpose intended. The lid is formed without the need of an opening there through as in the pan. The periphery of the pan's upper surface including the elevated portion with the openings includes groove means that mates with the distal periphery of the lid formed to form a gas tight seal therewith.

A plug or closure element is provided to seal of the openings through the elevated periphery of the pan. The closure or plug can be constructed of any material suitable for the purpose intended. Preferably, the closure element or plug can be made of plastic or the like that is structurally unchanged from the expected heat of cooking.

Although the openings in the elevated portion of the pan are referred discretely, they may be combined as a single "T" or invert "T" configuration. Such arrangements are merely alternative versions of the same invention and will constitute matter which is fully anticipated.

The lid also includes an opening for venting gasses from the food being cooked. The opening is preferably located above the apex of the elevated periphery of the pan.

It is a primary object of this invention to provide a versatile cooking apparatus.

It is another object of this invention to provide a cooking apparatus wherein the elevated portion of the pan periphery has special access ports formed there through.

It is a further object of this invention to provide the noted access ports suitable for passing a cooking utensil there through for stirring, turning or flipping the contents or adding ingredients while cooking is in progress.

A further object is to enable the stirring, turning, flipping or adding ingredients without removing the lid.

A still further object of this invention is to provide a closure for the opening or openings through the elevated surface when access to the interior of the pan with lid thereon is not desired.

Yet another object of the invention is to provide a vent opening in the lid of the cooking apparatus.

Yet another object of this invention is to provide a combination pan with openings and a lid with a peripheral vent opening that engages the periphery of the pan in a sealing relationship that is economically inexpensive to construct.

Other objects and advantages of the invention will be apparent during the reading of the following description along with the accompanying drawing Figures in which like numerals are used to designate like parts or elements.

IN THE DRAWINGS

PREFERRED EMBODIMENTS OF THE INVENTION

Figure 1:
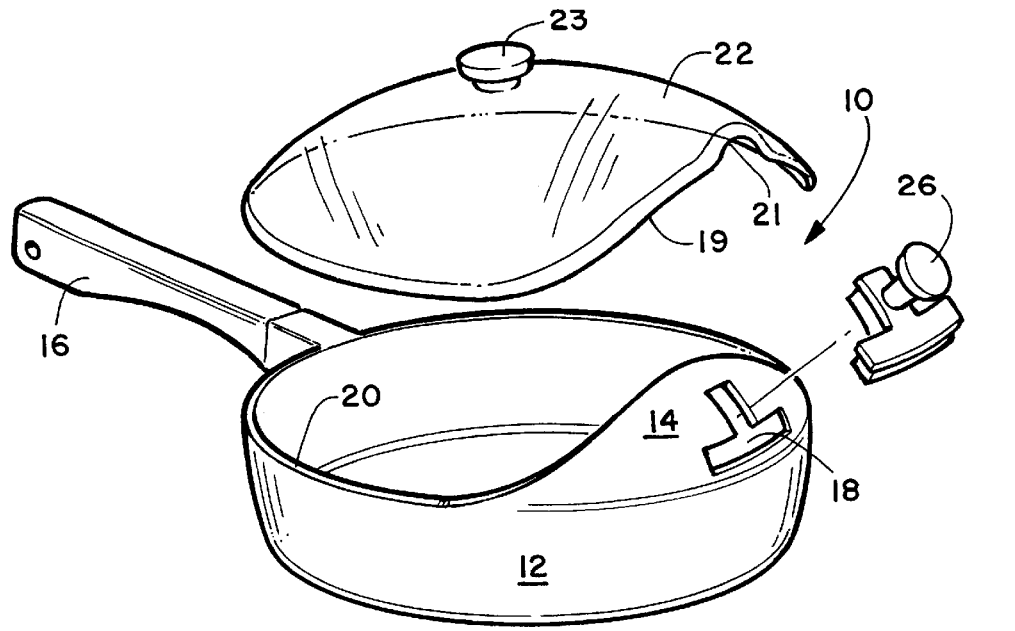
FIG. 1 depicts a perspective exploded showing of the pan with an elevated periphery portion with openings therethrough and a pan lid separated and the closure for the elevated pan periphery openings of the invention.
Figure 2:
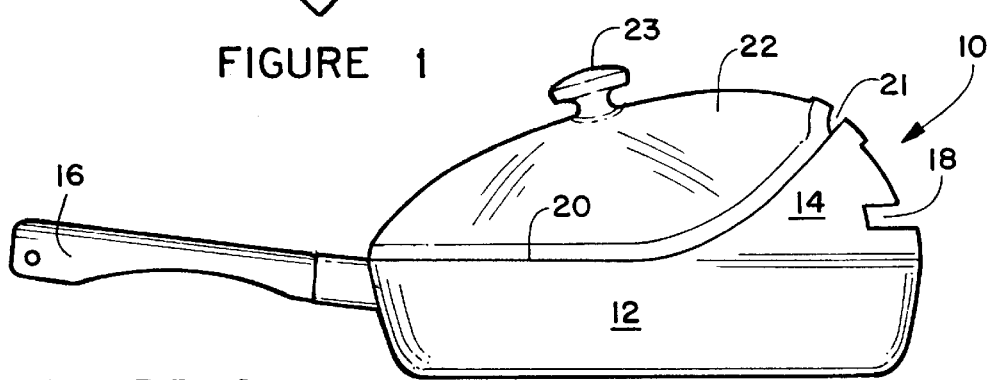
FIG. 2 is a side view of the invention of drawing FIG. 1 with the lid in place for cooking.
Figure 3:
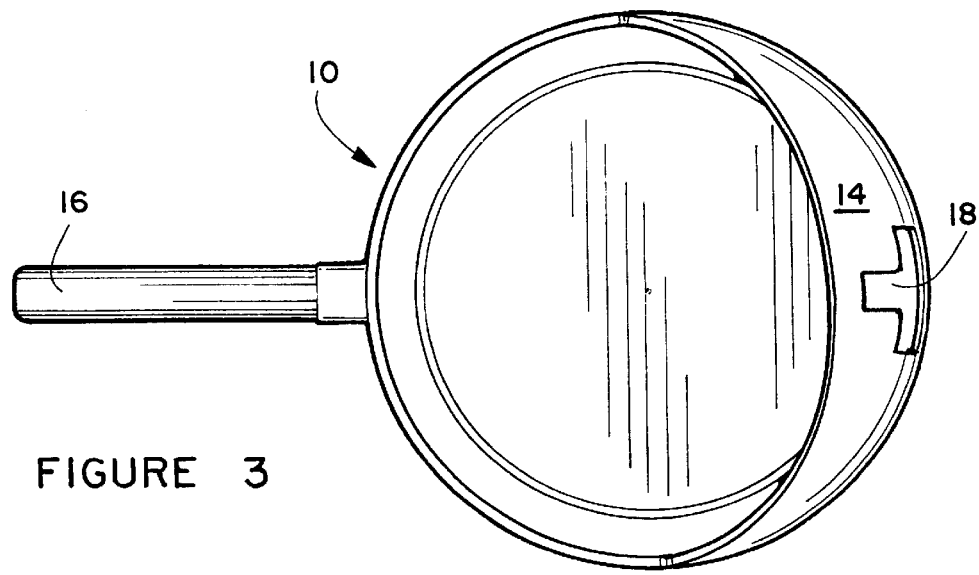
FIG. 3 is a top plan view of the pan and lid of drawing FIG. 1 with the lid removed.

Referring now specifically to the various drawing Figures, the cooking apparatus 10 of FIGS. 1–3 includes a pan 12 that has an elevated surface 14, a heat resistant handle 16 that is fixedly attached to the pan. The elevated surface 14 includes an opening or cutout 18 therethrough for receiving a cooking utensil suitable for stirring, turning or flipping food or for adding ingredients or the like to the food being cooked in the pan without removing the lid. The periphery edge 19 of the lid except or the vent opening 21 mates with the peripheral 20 of the pan when positioned as depicted in drawing FIG. 2. The mating of the lid and pan provide a positive gravity connection there between. A knob 23 on the top of the lid is used for removing the lid from the pan.

When access to the interior of the pan 12 is not desired the openings or cutout 18 can be sealed by the use of a plug or closure member 26. The plug or closure member is constructed of resilient material that allows for a slight amount of distortion when forced into the opening or cutout 18. The plug 26 can be formed of any suitable resilient material for the purpose intended. Preferably, the plug or closure is formed of heat tolerant soft plastic, rubber or any other suitable material suitable for the purpose intended.

The handle 16 is fixedly attached to the pan and is formed of a non resilient and non heat transfer material suitable for the purpose intended, such as plastic, hard rubber or the like.

With respect to the above description then, it is to be realized that optimum dimensional relationships for the various parts of the invention, to include variation in size, materials, shape, form, function and manner of operation, assembly and use, are deemed readily apparent and obvious to one skilled in the art, and all equivalent relationships to those illustrated in the drawing figures and described in the specification are intended to encompassed by the invention.

Therefore, the foregoing is considered as illustrative only of the principles of the invention. Further, since numerous modifications and changes will readily occurs to those skilled in the art, it is not desired to limit the invention to the exact construction and operation shown and described, and accordingly to, falling within the scope of the invention.

What is claimed is:

1. A cooking apparatus comprising:
   a pan portion having a bottom surface and an upwardly extending side wall, said side wall having a periphery, said periphery having elevated portion having an apex, said elevated portion having at least one opening therethrough wherein a cooking utensil can be inserted through said at least one opening for stirring, turning, flipping or adding ingredients to food cooking therein and
   a lid having a periphery for mating with said periphery of said side wall.

2. The invention as defined in claim 1 wherein said at least one opening is horizontal relative to said bottom surface.

3. The invention as defined in claim 1 wherein said at least one opening extending in a direction normal to said bottom surface.

4. The invention as defined in claim 1 wherein said at least one opening is a first opening horizontal to said bottom surface and a second opening extending in a direction normal to said bottom surface.

5. The invention as defined in claim 4 wherein said first and second openings form a "T" configuration.

6. The invention as defined in claim 1 furthering comprising a vent means along said periphery of said lid.

7. The invention as defined in claim 6 wherein said vent means is an opening adjacent to said apex of said periphery of said side wall.

8. The invention as defined in claim 1 additionally comprising a closure means for selectively sealing said at least one opening.

\* \* \* \* \*